United States Patent
Patel et al.

(10) Patent No.: US 10,929,255 B2
(45) Date of Patent: Feb. 23, 2021

(54) REDUCING THE SIZE OF FAULT DOMAINS

(71) Applicant: EMC IP HOLDING COMPANY LLC, Hopkinton, MA (US)

(72) Inventors: Dixit Patel, Monroe, NJ (US); William Davenport, San Diego, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 233 days.

(21) Appl. No.: 16/174,432

(22) Filed: Oct. 30, 2018

(65) Prior Publication Data

US 2020/0133808 A1    Apr. 30, 2020

(51) Int. Cl.
*G06F 11/00* (2006.01)
*G06F 11/20* (2006.01)
*G06F 11/14* (2006.01)
*G06F 12/109* (2016.01)

(52) U.S. Cl.
CPC ...... *G06F 11/2094* (2013.01); *G06F 11/1451* (2013.01); *G06F 11/1469* (2013.01); *G06F 12/109* (2013.01); *G06F 2201/805* (2013.01); *G06F 2201/82* (2013.01); *G06F 2201/84* (2013.01); *G06F 2212/1032* (2013.01); *G06F 2212/657* (2013.01)

(58) Field of Classification Search
CPC ............. G06F 11/2094; G06F 11/1451; G06F 11/1469; G06F 11/1446; G06F 11/1448; G06F 11/1456; G06F 11/1466; G06F 12/109; G06F 12/0223; G06F 12/1036; G06F 2201/805; G06F 2201/82; G06F 2201/84; G06F 2212/1032; G06F 2212/657; G06F 3/0628; G06F 3/0629; G06F 3/0638; G06F 3/0644; G06F 3/0655; G06F 3/0665; G06F 3/0667; G06F 16/11; G06F 16/113; G06F 16/122; G06F 16/128
See application file for complete search history.

(56) References Cited

U.S. PATENT DOCUMENTS

| | | | |
|---|---|---|---|
| 8,370,688 B2 * | 2/2013 | Mazina | G06F 11/0727 714/42 |
| 9,311,014 B2 * | 4/2016 | Ezra | G06F 3/0605 |
| 9,454,314 B2 * | 9/2016 | Wood | G06F 3/0665 |

* cited by examiner

*Primary Examiner* — Anthony J Amoroso
(74) *Attorney, Agent, or Firm* — Anderson Gorecki LLP

(57) ABSTRACT

A separate family space is provisioned as a separate fault domain for each production device in a storage system. The space provisioned for each family has contiguous logical block addresses that do not overlap with the address space of any other family. Snaps and clones in a first family space are used for fault recovery without interrupting IOs to a second family space. If the first family space points to the same virtual block as other families as a result of deduplication then the virtual block is un-deduped. For example, another instance of the virtual block may be created and pointers updated such that only the first family space points to one of the virtual block instances.

20 Claims, 6 Drawing Sheets

REDUCING THE SIZE OF FAULT DOMAINS

TECHNICAL FIELD

The subject matter of this disclosure is generally related to computer networks in which a storage array maintains data for multiple hosts, and more particularly to reducing the size of data recovery fault domains in such networks.

BACKGROUND

Host servers (hosts) run host applications such as file servers, block servers, databases, and email servers, for example, and without limitation. Host application data is maintained on non-volatile storage drives that are managed by a storage array. The managed drives are not discoverable by the hosts, but the storage array creates logical volumes that map to the managed drives and are discoverable by the hosts. For example, the storage array may create a separate production device for each host application. The hosts access the host application data by sending IOs to the production devices. The storage array implements the IOs by accessing the managed drives based on metadata that provides a mapping between the production devices and the managed drives.

The data stored on the storage array may be backed up in order to avoid permanent data loss. Full backups typically require considerable time and resources, so an initial full backup that generates a clone may be supported by subsequent incremental backups. For example, snapshots (snaps) of the clone may be periodically generated and stored on a different storage array along with the clone. A snap is an incremental representation of the clone that includes only changes that have occurred since some prior point in time, e.g. the time of creation of a preceding snap. If data stored on the managed drives is corrupted or lost due to drive failure, then the clone and snaps may be used for data recovery.

SUMMARY

All examples, aspects and features mentioned in this document can be combined in any technically viable way.

In accordance with an aspect a method comprises: in a storage array comprising a plurality of interconnected computing nodes and a plurality of groups of non-volatile data storage drives, each group of data storage drives connected with one of the computing nodes: presenting a plurality of production devices for storage of host application data; provisioning, in a virtual storage space, a separate family space as a separate fault domain for each of the production devices, including a first family space for a first production device and a second family space for a second production device; storing a first snap of the first production device in the first family space; storing a second snap of the second production device in the second family space; and recovering from a fault associated with the first production device by accessing the first snap without interrupting input-output commands to the second production device. In some implementations provisioning the separate family space for each of the production devices comprises provisioning contiguous logical block addresses for the first family. Some implementations comprise provisioning contiguous logical block addresses for the second family such that the logical block addresses of the first family and the second family do not overlap. Some implementations comprise storing a first clone of the first production device in the first family space. Some implementations comprise storing a second clone of the second production device in the second family space. Some implementations comprise recognizing that a first virtual block associated with the first snap is associated with a first pointer structure from the first family space and a second pointer structure from the second family space. Some implementations comprise creating a second virtual block that is a copy of the first virtual block. Some implementations comprise modifying the first pointer structure to associate the first snap with the second virtual block. Some implementations comprise modifying the second pointer structure to associate the second snap with the second virtual block.

In accordance with an aspect an apparatus comprises: a plurality of interconnected computing nodes that present a plurality of production devices for storage of host application data; a plurality of groups of non-volatile data storage drives, each group of data storage drives connected with one of the computing nodes, the data storage drives storing the host application data; and program code that: provisions, in a virtual storage space, a separate family space as a separate fault domain for each of the production devices, including a first family space for a first production device and a second family space for a second production device; stores a first snap of the first production device in the first family space; stores a second snap of the second production device in the second family space; and recovers from a fault associated with the first production device by accessing the first snap without interrupting input-output commands to the second production device. In some implementations the program code provisions contiguous logical block addresses for the first family. In some implementations the program code provisions contiguous logical block addresses for the second family such that the logical block addresses of the first family and the second family do not overlap. In some implementations the program code stores a first clone of the first production device in the first family space. In some implementations the program code stores a second clone of the second production device in the second family space. In some implementations the program code recognizes that a first virtual block associated with the first snap is associated with a first pointer structure from the first family space and a second pointer structure from the second family space. In some implementations the program code creates a second virtual block that is a copy of the first virtual block. In some implementations the program code modifies the first pointer structure to associate the first snap with the second virtual block. In some implementations the program code modifies the second pointer structure to associate the second snap with the second virtual block.

In accordance with an aspect an apparatus comprises: a computing node that presents a plurality of production devices for storage of host application data and manages storage of the host application data on a plurality of non-volatile data storage drives, the computing node comprising program code that: provisions a separate family space as a separate fault domain in a virtual storage space for each of the production devices, including a first family contiguous logical block address space for a first production device and a second family contiguous logical block address space for a second production device such that the logical block addresses of the first family and the second family do not overlap; stores a first clone and a first snap of the first production device in the first family space; stores a second clone and a second snap of the second production device in the second family space; and recovers from a fault associated with the first production device by accessing the first snap without interrupting input-output commands to the second production device. In some implementations the program code: recognizes that a first virtual block associated with the first snap is associated with a first pointer structure from the first family space and a second pointer structure from the second family space; creates a second virtual block that is a copy of the first virtual block; and modifies the first pointer structure to associate the first snap with the second virtual block.

Other aspects, features and implementations may become apparent in view of the detailed description and figures.

DETAILED DESCRIPTION

Some aspects, features and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor hardware components. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible non-transitory features. For example, a virtual storage device could be based on multiple physical storage drives. The term "logic" is used to refer to special purpose physical circuit elements and software instructions that are stored on a non-transitory computer-readable medium and implemented by general-purpose tangible processors.

Figure 1:
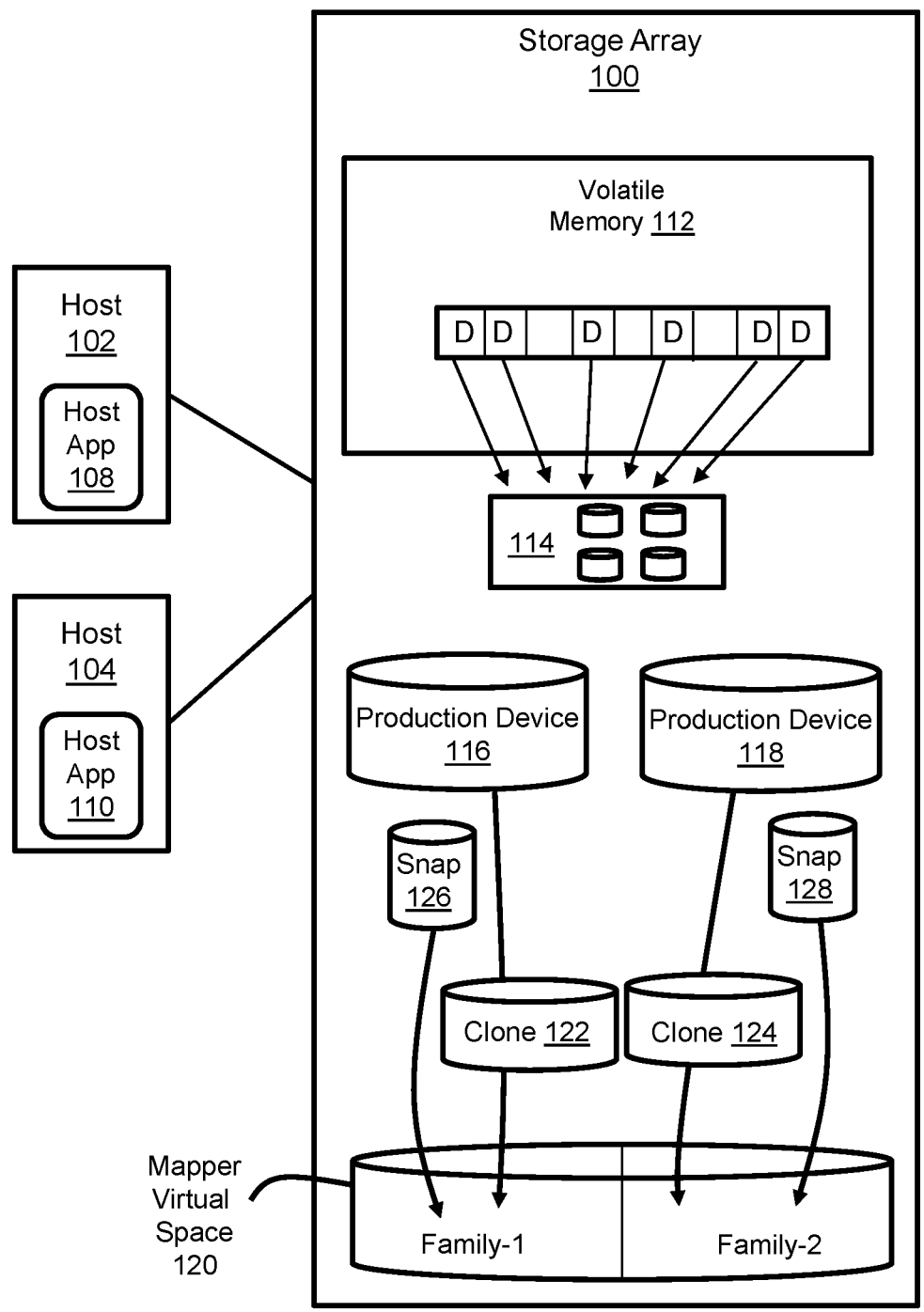
FIG. 1 illustrates a storage system with reduced-size fault domains.

FIG. 1 illustrates a storage system with reduced-size fault domains for data recovery. Storage array 100 is connected with hosts 102, 104. Host 102 runs multiple instances of a first host application 108. Host 104 runs multiple instances of a second host application 110, that is different than the first host application. The storage array 100 includes volatile memory 112 and non-volatile managed drives 114. A first production device 116 is a logical volume of storage created for host application data associated with the first host application 108. A second production device 118 is a logical volume of storage created for host application data associated with the second host application 110. Although only a single storage array is illustrated for simplicity, the storage system could include multiple storage arrays, e.g. backups could be maintained on a second storage array.

It is known to store a copy of all host application data as a clone and subsequently store snapshots of that clone. For example, the clone and snaps could be stored in a single mapper virtual space 120. However, in such an implementation the fault domain for data recovery is the entire mapper virtual space, which includes data of both host applications. Consequently, IOs from instances of both host applications are interrupted by recovery operations.

In the illustrated implementation the mapper virtual space 120 is organized into separate family spaces Family-1, Family-2. Family-1 is virtual storage space for a clone (primary volume) 122 of production device 116 and host-specific snaps generated therefrom, such as snap 126. The clone 122 may be an initial copy of the production device 116. Family-2 is virtual storage space for a clone 124 of production device 118 and host-specific snaps generated therefrom, such as snap 128. The clone 124 may be an initial copy of the production device 118. One technique for creating the snaps is to force flush all dirty data D from the volatile memory 112 to the managed drives 114. The dirty data in the volatile memory 112 represents changes to the production devices 116, 118 that are not present in the managed drives 114. Each family is a separate fault domain associated with a particular production device. As a result of the smaller size of the fault domains, recovery operations may interrupt IOs from fewer than all host applications, e.g. interrupting only one host application.

Figure 2:
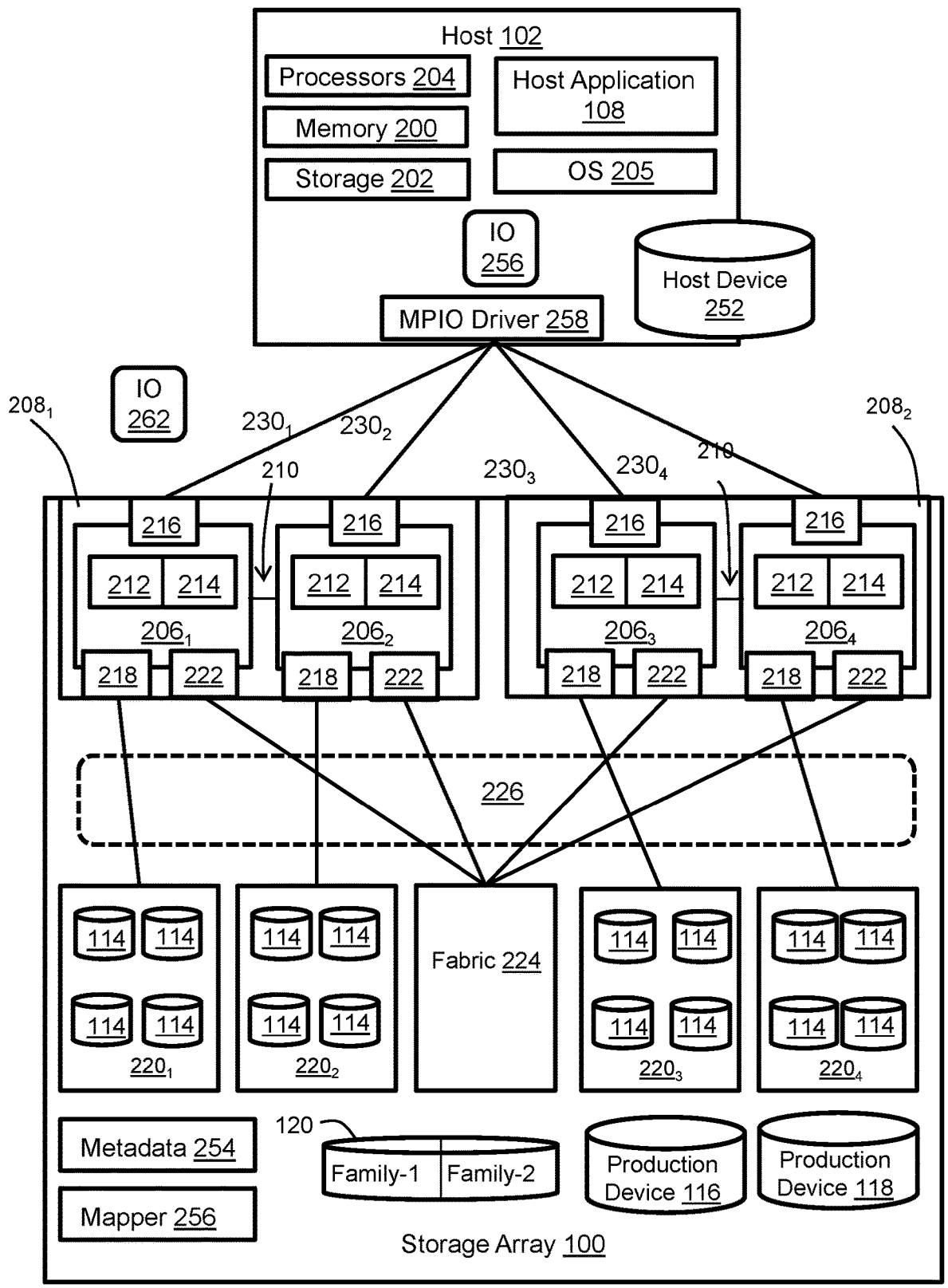
FIG. 2 illustrates the host computer and storage array of FIG. 1 in greater detail.

FIG. 2 illustrates the host 102 and storage array 100 of FIG. 1 in greater detail. The host 102 may be a server computer with volatile memory 200, non-volatile storage 202, one or more tangible processors 204, and an OS (operating system) or hypervisor 205. The host 102 might support virtual hosts running on virtual machines or containers, and although an external host computer is illustrated, internal hosts may be instantiated within the storage array.

The storage array 100 includes a plurality of computing nodes $206_1$-$206_4$. Pairs of the computing nodes, e.g. ($206_1$, $206_2$) and ($206_3$, $206_4$), may be organized as storage engines $208_1$, $208_2$, respectively, for purposes of failover between computing nodes. The paired computing nodes of each storage engine may be directly interconnected by communication links 210. Each computing node includes at least one tangible multi-core processor 212 and a local volatile memory 214. The local volatile memory 214 may include, for example and without limitation, components such as RAM (random access memory) of any type. Each computing node may include one or more FAs 216 (front-end adapters) for communicating with the host 102. Each computing node $206_1$-$206_4$ may also include one or more BAs 218 (back-end adapters) for communicating with respective associated back-end storage bays $220_1$-$220_4$, thereby enabling access to managed drives 114. The managed drives 114 may include tangible persistent storage components of one or more technology types, for example and without limitation SSDs (Solid State Drives) such as flash, and HDDs (hard disk drives) such as SATA (Serial Advanced Technology Attachment) and FC (Fibre Channel). Each computing node may also include one or more CAs (channel adapters) 222 for communicating with other computing nodes via an interconnecting fabric 224. Each computing node may allocate a portion or partition of its respective local volatile memory 214 to a virtual shared memory 226 that can be accessed by other computing nodes, e.g. via DMA (direct memory access) or RDMA (remote direct memory access). In some implementations the shared memory 226 is the volatile memory 112 shown in FIG. 1.

The storage array 100 maintains data for instances of the first host application 108 running on the host 102. Host application instances may write host application data to the storage array and read host application data from the storage array in order to perform various functions. Examples of host applications may include but are not limited to file servers, email servers, block servers and databases. The production device 118 and a corresponding host device 252 are created to enable the storage array to provide storage services to the host application instances. Without limitation, the production device 118 may be referred to as a production volume or production LUN, where LUN (Logical Unit Number) is a number used to identify the logical storage volume in accordance with the SCSI (Small Computer System Interface) protocol. The host device 252 is a representation of the production device 118. The host device 252 and the production device 118 are abstraction layers between the managed drives 114 and the host application instances. From the perspective of the host, the production device 118 is a single data storage device having a set of contiguous fixed-size LBAs (logical block addresses) on which data used by the host application instances resides. However, the data used by the host applications is maintained by the computing nodes $206_1$-$206_4$ at non-contiguous addresses on various different managed drives 114.

In order to service IOs from the host application instances, the storage array 100 maintains metadata 254 that indicates, among various things, mappings between production device 118 storage space and the locations of extents of host application data on the managed drives 114. In response to an IO 256 from an instance of the host application 248 to host device 252, an MPIO (Multi-Path Input-Output) driver 258 may determine whether the IO can be serviced by accessing the host memory 200. If that is not possible then the MPIO driver generates JO 262 with reference to production device 118 and selects a path on which to send the JO 262 to the storage array 100. There are multiple paths $230_1$-$230_4$ between the host 102 and the storage array 100, e.g. one path per FA 216. Each path may have a locally unique address that is known to the MPIO driver 258. However, the host application is not aware of the paths and addresses because it views the host device 252 as being available via a single logical path. The paths may be selected by the MPIO driver based on a wide variety of techniques and algorithms including, for context and without limitation, performance and load balancing. In the case of a read JO 262 the storage array uses the metadata 254 to locate the requested data, e.g. in the shared memory 226 or managed drives 114. If the requested data is not in the shared memory, then it is temporarily copied into the shared memory from the managed drives and sent to the host application via one of the computing nodes. In the case of a write IO 262 the storage array marks the data as dirty and creates new metadata that maps the production device address with a location to which the data is written on the managed drives. The shared memory 226 may enable the production device to be reachable via all of the computing nodes and paths, although the storage array can be configured to limit use of certain paths to certain production devices. A mapper 256 manages how the clones and snaps of production devices 116, 118 map to the mapper virtual space 120.

Figure 3:
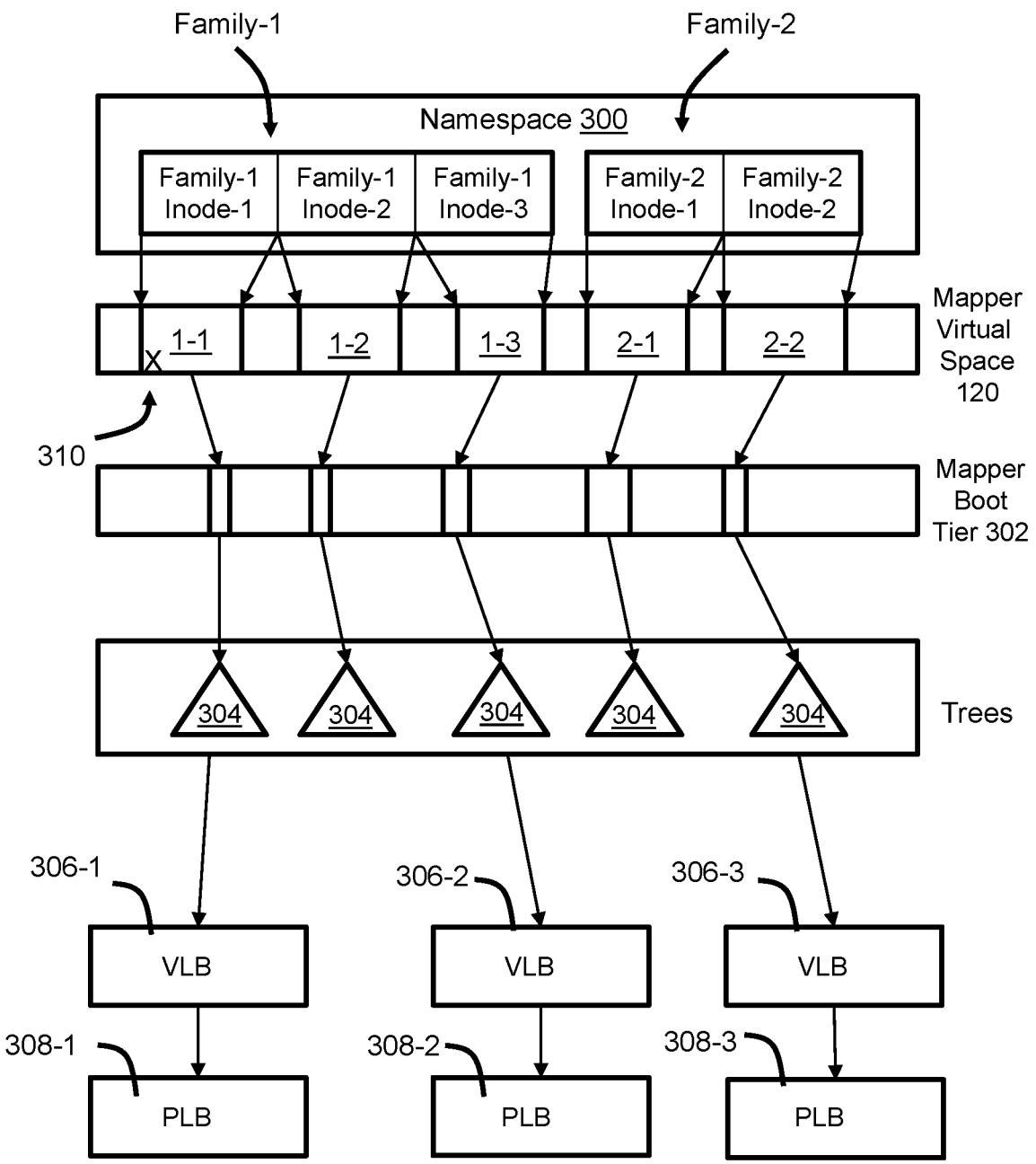
FIG. 3 illustrates snapshot family ownership of mapper virtual space.

FIG. 3 illustrates snapshot family ownership of mapper virtual space 120. Namespace 300, which is a data path component, includes the two families Family-1, Family-2 corresponding to the production devices. Each family includes multiple inodes. Inode-1 of family-1 is a clone of production device 116 (FIG. 1). Inode-2 and inode-3 of family-1 are snaps of that clone. Inode-1 of family-2 is a clone of production device 118 (FIG. 1). Inode-2 of family-2 is a snap of that clone of production device 118. Each inode is provisioned with contiguous logical block address space in the virtual mapper space 120, e.g. contiguous space 1-1 to family-1, inode-1, and contiguous space 1-3 to family-1, inode-3. Moreover, the address space provisioned to family-1 does not overlap with the address space allocated to family-2. A nested extent allocator for the entire namespace in mapper 256 (FIG. 2) and smaller binary buddy allocators, one per snapshot family, nested into the system-wide extent allocator control provisioning of the mapper virtual space. The provisioned mapper virtual space 120 maps to a mapper boot tier 302 and pointer trees 304 to VLBs (virtual large blocks) 306-1, 306-2, 306-3. The VLBs map to PLBs (physical large blocks) 308-1, 308-2, 308-3 of the managed drives. The PLBs may each be contiguous address space and the VLBs may have contiguous LBAs. When data corruption associated with a specific mapper virtual space occurs in an IO path, a recovery operation such as FSCK (file system consistency check) can be run on the associated snapshot family without interrupting IOs to other families. For example, a fault 310 can be remedied by FSCK recovery on family-1 without interrupting IOs to family-2. Consequently, operation of the storage system is improved.

Figure 4:
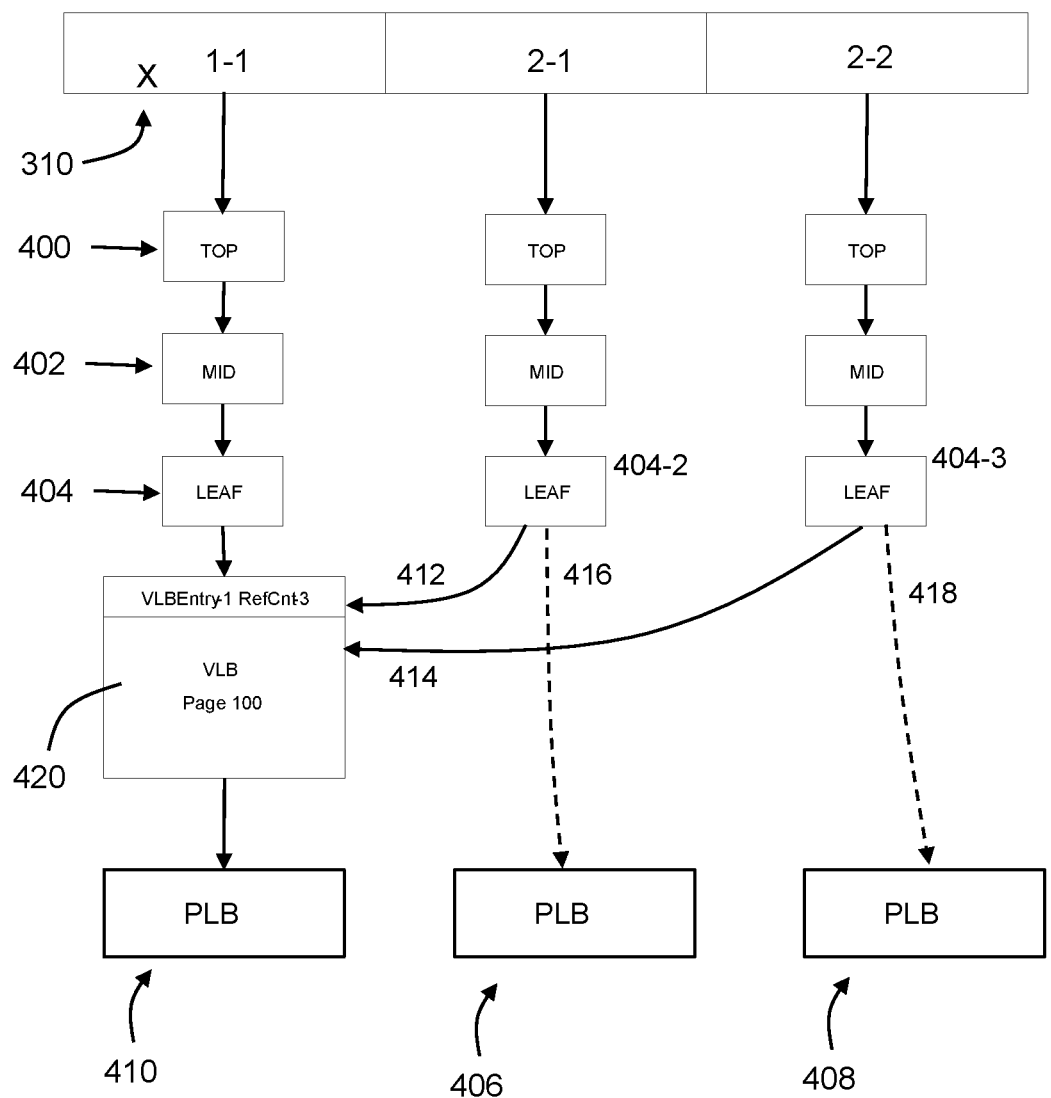
FIGS. 4 and 5 illustrate un-dedup for recovery using a reduced-size fault domain.

Referring to FIG. 4, each pointer tree 304 (FIG. 3) may include a top level 400, middle level 402 and leaf level 404 that map the contiguous LBAs of the mapper virtual space 120 for each inode to VLBs and PLBs. Deduplication (dedup) may be implemented at the VLB level. For example, redundant copies 406, 408 of a PLB 410 can be eliminated through deduplication by creating pointers 412, 414 from leaves 404-2, 404-3 to a single VLB 420 associated with a single copy 410 of the redundant PLB. The created pointers 412, 414 may replace existing pointers 416, 418 to VLBs associated with redundant PLB 406 and PLB 408. After the pointers 412, 414 have been created, the redundant PLBs 406, 408 are released to a storage pool. After dedup, IOs to space 1-1, 2-1, and 2-2, are all directed to the same PLB 410.

Figure 5:
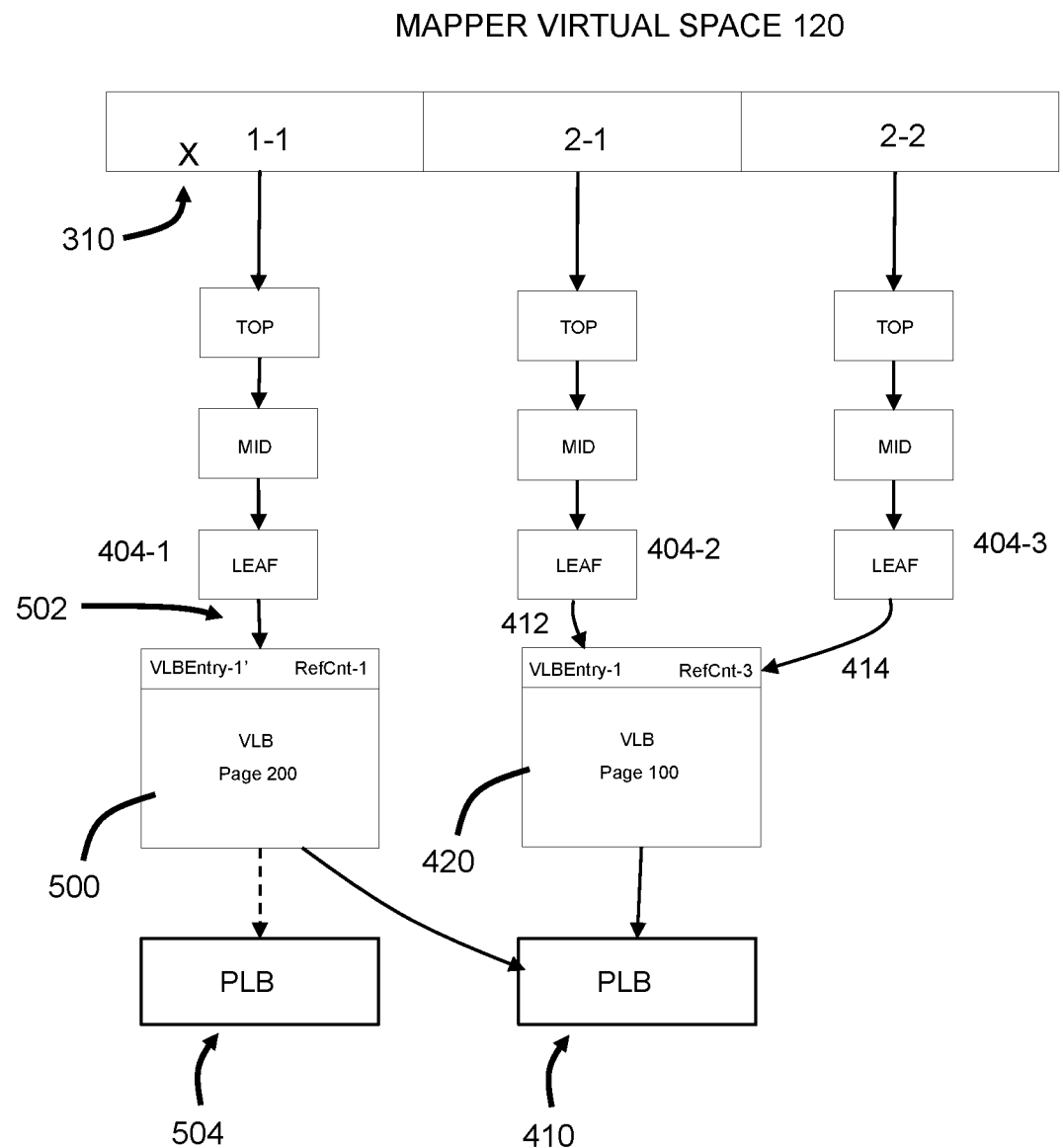

Referring to FIGS. 4 and 5, if a data recovery operation such as FSCK encounters a deduped VLB that is associated with pointers from multiple families, i.e. that is shared across families, then a new instance of the VLB is created. In the illustrated example VLB 420, which is shared across family-1 and family-2, is encountered in response to a recovery operation associated with fault 310. At the physical level the fault may or may not be in PLB 410. The newly created instance of VLB 420, shown as VLB 500, may be exclusively associated with the family being recovered, which in the illustrated example is family-1. A new pointer 502 is created from leaf 404-1 to VLB 500. VLB 420 continues to be associated with the other families, which in the illustrated example is family-2 by way of pointers 412, 414 from 2-1 and 202. VLB 500 may continue to point to PLB 410 or alternatively to a redundant copy PLB 504 that may be created. This un-dedup technique allows on-going recovery operations to continue for the family associated with the fault at the mapper virtual space level without interrupting IOs to families that are not associated with the fault at the mapper virtual space level.

Figure 6:
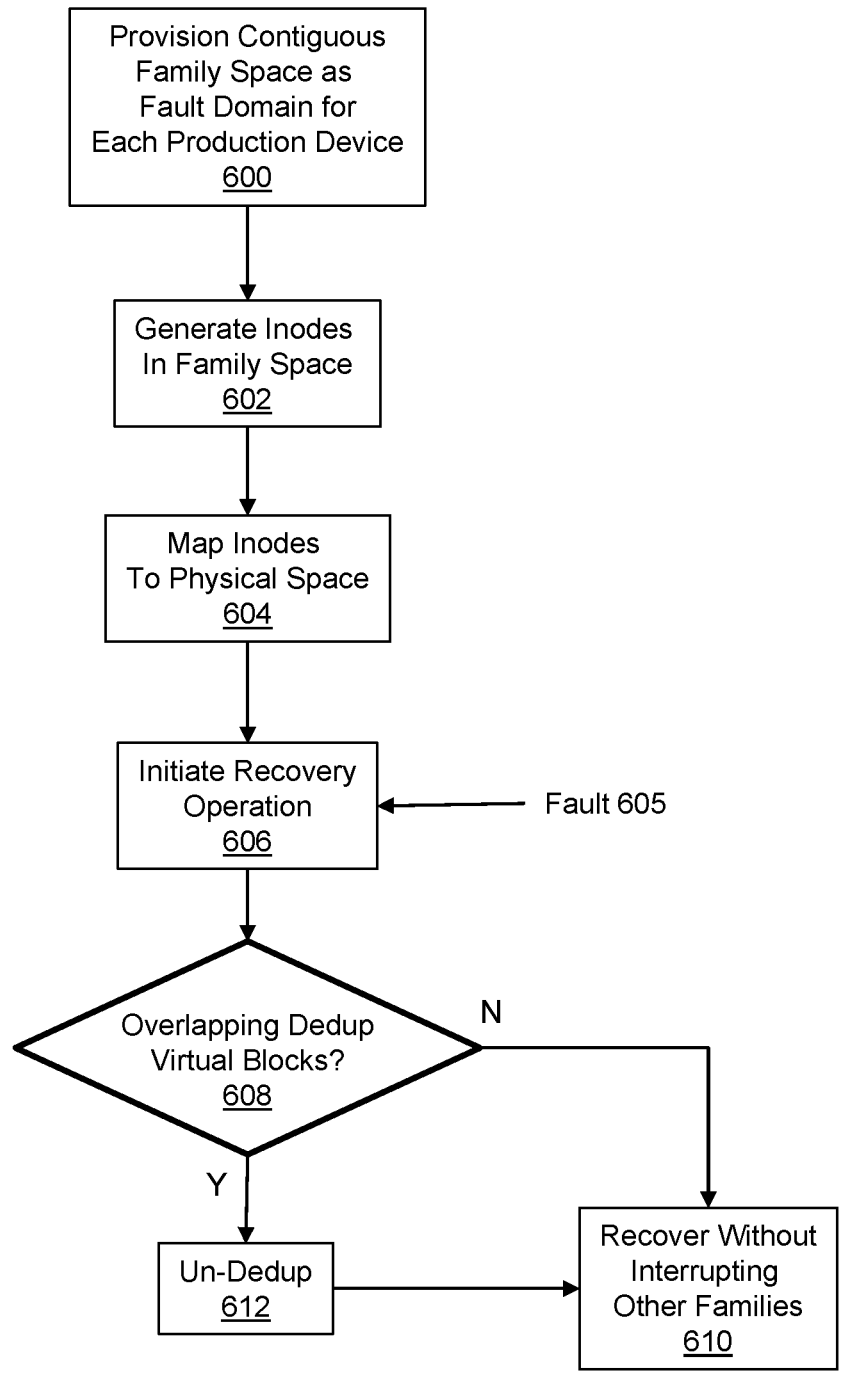
FIG. 6 is a flow diagram of implementation reduced-size fault domains and data recovery therewith.

FIG. 6 is a flow diagram that illustrates implementation and use of reduced-size fault domains for data recovery. A separate family space is provisioned in a virtual storage space for each production device as indicated in step 600. Each family space may be provisioned with contiguous LBAs such that the spaces of different families do not overlap. For example, a first family does not own an LBA that is between two LBAs owned by another single family. Each family space is a fault domain for the associated production device. Modes are generated in the family space as indicated in step 602. The inodes may include one or more clones and snaps of the production device that is associated with the family. The inodes are mapped to physical storage space as indicated in step 604. The mapping may include a variety of descriptive data structures that may include pointer trees and virtual blocks. In response to an input such as a fault 605, recovery operations are initiated as indicated in step 606. Recovery operations may include accessing data associated with the snaps and clones of the family with which the fault is associated. If overlapping deduped virtual blocks are not encountered as indicated in step 608 then recovery proceeds without interrupting other families as indicated in step 610. If overlapping virtual blocks are encountered as indicated in step 608 then the overlapping blocks are un-deduped as indicated in step 612 to enable recovery to proceed without interrupting other families as indicated in step 610. Step 612 may include creating a new instance of a virtual block having pointers from multiple families. The new instance of the virtual block may be associated only with pointers from the family being recovered while pointers from other families are associated with the pre-existing instance of the virtual block.

Specific examples have been presented in order to provide context and convey inventive concepts. The specific examples are not to be considered as limiting. A wide variety of modifications may be made without departing from the scope of the inventive concepts described herein. Moreover, the features, aspects, and implementations described herein may be combined in any technically conceivable way. Accordingly, modifications and combinations are within the scope of the following claims.

What is claimed is:

1. A method comprising:
   in a storage array comprising a plurality of interconnected computing nodes and a plurality of groups of non-volatile data storage drives, each group of data storage drives connected with one of the computing nodes:
   presenting a plurality of production devices for storage of host application data, each production device storing data associated with a different host application;
   provisioning, in a single mapper virtual storage space comprising a single namespace that maps to physical blocks of the non-volatile data storage drives via pointer trees and virtual blocks, a separate family space as a separate fault domain for each of the production devices, including a first family space for a first production device and a non-overlapping second family space for a second production device;
   storing a first snap of the first production device at contiguous logical block address space in the first family space;
   storing a second snap of the second production device at contiguous logical block address space in the second family space; and
   recovering from a fault associated with the first production device by accessing the first snap without interrupting input-output commands to the second production device.

2. The method of claim 1 wherein provisioning the separate family space for each of the production devices comprises provisioning contiguous logical block addresses for the first family.

3. The method of claim 2 comprising provisioning contiguous logical block addresses for the second family such that the logical block addresses of the first family and the second family do not overlap.

4. The method of claim 1 comprising storing a first clone of the first production device in the first family space.

5. The method of claim 4 comprising storing a second clone of the second production device in the second family space.

6. The method of claim 1 comprising recognizing that a first virtual block associated with the first snap is associated with a first pointer structure from the first family space and a second pointer structure from the second family space.

7. The method of claim 6 comprising creating a second virtual block that is a copy of the first virtual block.

8. The method of claim 7 comprising modifying the first pointer structure to associate the first snap with the second virtual block.

9. The method of claim 7 comprising modifying the second pointer structure to associate the second snap with the second virtual block.

10. An apparatus comprising:
    a plurality of interconnected computing nodes that present a plurality of production devices for storage of host application data, each production device storing data associated with a different host application;
    a plurality of groups of non-volatile data storage drives, each group of data storage drives connected with one of the computing nodes, the data storage drives storing the host application data; and
    program code that:
    provisions, in a single mapper virtual storage space comprising a single namespace that maps to physical blocks of the data storage drives via pointer trees and virtual blocks, a separate family space as a separate fault domain for each of the production devices, including a first family space for a first production device and a non-overlapping second family space for a second production device;
    stores a first snap of the first production device at contiguous logical block address space in the first family space;
    stores a second snap of the second production device at contiguous logical block address space in the second family space; and
    recovers from a fault associated with the first production device by accessing the first snap without interrupting input-output commands to the second production device.

11. The apparatus of claim 10 wherein the program code provisions contiguous logical block addresses for the first family.

12. The apparatus of claim 11 wherein the program code provisions contiguous logical block addresses for the second family such that the logical block addresses of the first family and the second family do not overlap.

13. The apparatus of claim 10 wherein the program code stores a first clone of the first production device in the first family space.

14. The apparatus of claim 13 wherein the program code stores a second clone of the second production device in the second family space.

15. The apparatus of claim 10 wherein the program code recognizes that a first virtual block associated with the first snap is associated with a first pointer structure from the first family space and a second pointer structure from the second family space.

16. The apparatus of claim 15 wherein the program code creates a second virtual block that is a copy of the first virtual block.

17. The apparatus of claim 16 wherein the program code modifies the first pointer structure to associate the first snap with the second virtual block.

18. The apparatus of claim 16 wherein the program code modifies the second pointer structure to associate the second snap with the second virtual block.

19. An apparatus comprising:
a computing node that presents a plurality of production devices for storage of host application data and manages storage of the host application data on a plurality of non-volatile data storage drives, each production device storing data associated with a different host application, the computing node comprising program code that:
provisions a separate family space as a separate fault domain in a single mapper virtual storage space comprising a single namespace that maps to physical blocks of the non-volatile data storage drives via pointer trees and virtual blocks for each of the production devices, including a first family contiguous logical block address space for a first production device and a second family contiguous logical block address space for a non-overlapping second production device such that the logical block addresses of the first family and the second family do not overlap;
stores a first clone and a first snap of the first production device at contiguous logical block address space in the first family space;
stores a second clone and a second snap of the second production device at contiguous logical block address space in the second family space; and
recovers from a fault associated with the first production device by accessing the first snap without interrupting input-output commands to the second production device.

20. The apparatus of claim 19 wherein the program code:
recognizes that a first virtual block associated with the first snap is associated with a first pointer structure from the first family space and a second pointer structure from the second family space;
creates a second virtual block that is a copy of the first virtual block; and
modifies the first pointer structure to associate the first snap with the second virtual block.

* * * * *